US011735922B2

(12) United States Patent
Adiga Manoor et al.

(10) Patent No.: US 11,735,922 B2
(45) Date of Patent: Aug. 22, 2023

(54) TEMPORAL BALANCING OF ELECTRICAL STRESS ON FACTS DEVICES IN FACTS BASED DISTRIBUTED IMPEDANCE INJECTION UNITS

(71) Applicant: Smart Wires Inc., Union City, CA (US)

(72) Inventors: Shreesha Adiga Manoor, Milpitas, CA (US); Michael Thomas Garrison Stuber, Newman Lake, WA (US); Antonio Ginart, Santa Clarita, CA (US); Haroon Inam, San Jose, CA (US)

(73) Assignee: Smart Wires Inc., Durham, NC (US)

( * ) Notice: Subject to any disclaimer, the term of this patent is extended or adjusted under 35 U.S.C. 154(b) by 149 days.

(21) Appl. No.: 17/332,011

(22) Filed: May 27, 2021

(65) Prior Publication Data

US 2022/0069582 A1 Mar. 3, 2022

Related U.S. Application Data

(60) Provisional application No. 62/706,629, filed on Aug. 28, 2020.

(51) Int. Cl.
| | | |
|---|---|---|
| *H02J 3/18* | (2006.01) | |
| *H02J 3/00* | (2006.01) | |
| *H02J 13/00* | (2006.01) | |
| *G05F 1/70* | (2006.01) | |
| *H02J 3/06* | (2006.01) | |
| *H02J 3/12* | (2006.01) | |
| *H02J 3/20* | (2006.01) | |

(52) U.S. Cl.
CPC .............. *H02J 3/1814* (2013.01); *G05F 1/70* (2013.01); *H02J 3/00125* (2020.01); *H02J 3/06* (2013.01); *H02J 3/12* (2013.01); *H02J 3/20* (2013.01); *H02J 13/00002* (2020.01); *H02J 13/00034* (2020.01)

(58) Field of Classification Search
CPC .... H02J 3/1814; H02J 3/20; H02J 3/12; H02J 3/00125; H02J 13/00002; H02J 13/00034; G05F 1/70
See application file for complete search history.

(56) References Cited

U.S. PATENT DOCUMENTS

| | | | |
|---|---|---|---|
| 10,218,175 B2 | 2/2019 | Inam et al. | |
| 11,159,046 B1* | 10/2021 | Kreikebaum | ..... H02J 13/00007 |
| 2017/0163245 A1* | 6/2017 | Iyer | ........ H02J 3/1807 |
| 2017/0237255 A1 | 8/2017 | Inam et al. | |
| 2018/0131290 A1* | 5/2018 | Ng | ......... H02M 7/501 |

* cited by examiner

*Primary Examiner* — Harry R Behm
(74) *Attorney, Agent, or Firm* — Womble Bond Dickinson (US) LLP (57) ABSTRACT

An impedance injection unit (IIU) system is coupled to a high-voltage (HV) transmission line. The IIUs are activated in sequences of activation in successive time periods. This injects an impedance waveform onto the HV transmission line. The ordering of IIUs in the sequences of activation is repeatedly changed in successive time periods. This equalizes electrical stress across the IIUs used, leading to overall improvement in IIU system lifetimes.

24 Claims, 8 Drawing Sheets

Fig.5
A 4X2 (4in seriesX2parallel) IIU
implementation of IIM

TEMPORAL BALANCING OF ELECTRICAL STRESS ON FACTS DEVICES IN FACTS BASED DISTRIBUTED IMPEDANCE INJECTION UNITS

CROSS-REFERENCE TO RELATED APPLICATIONS

This application claims benefit of priority from U.S. Provisional Application No. 62/706,629 filed Aug. 28, 2020, the disclosure of which is incorporated herein by reference in its entirety.

TECHNICAL FIELD

The present disclosure relates to improving lifetime and reliability of devices and systems used in power systems, and specifically to balancing the electrical stress on the high current handling FACTS devices used in transformer-less flexible alternating current transmission system (TL-FACTS) based impedance injection units (IIUs) of intelligent impedance injection modules (IIMs) distributed over high voltage power lines to manage power flow on high voltage (HV) transmission lines of an HV power grid.

BACKGROUND

Reliability of electronic devices is an important criterion for applications. This is especially true for flexible alternating current transmission system (FACTS) based control equipment and devices used in power distribution and on high-voltage power grids. These FACTS based devices for power flow control and for responding to disturbances on HV transmission lines have to have very high reliability as any maintenance on these equipment or devices used will require shutting down the HV power grid for a duration disrupting the delivery of power to load locations.

Figure 1:
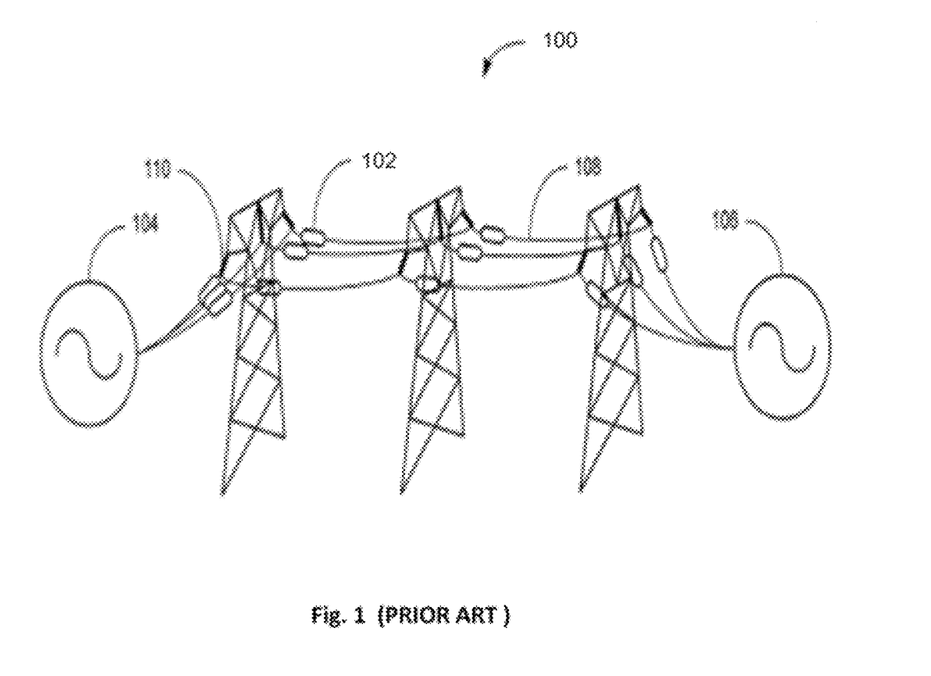
FIG. 1 is a diagram illustrating a conventional power grid system with a distributed and hierarchical intelligent control system.

Distributed impedance injection modules (IIMs) 102 are distributed and coupled to HV transmission lines 108 as shown in an example HV power grid 100 of FIG. 1. The HV transmission lines 108 of the HV power grid 100 are used to transfer power from generators 104 to loads 106.

Figure 2:
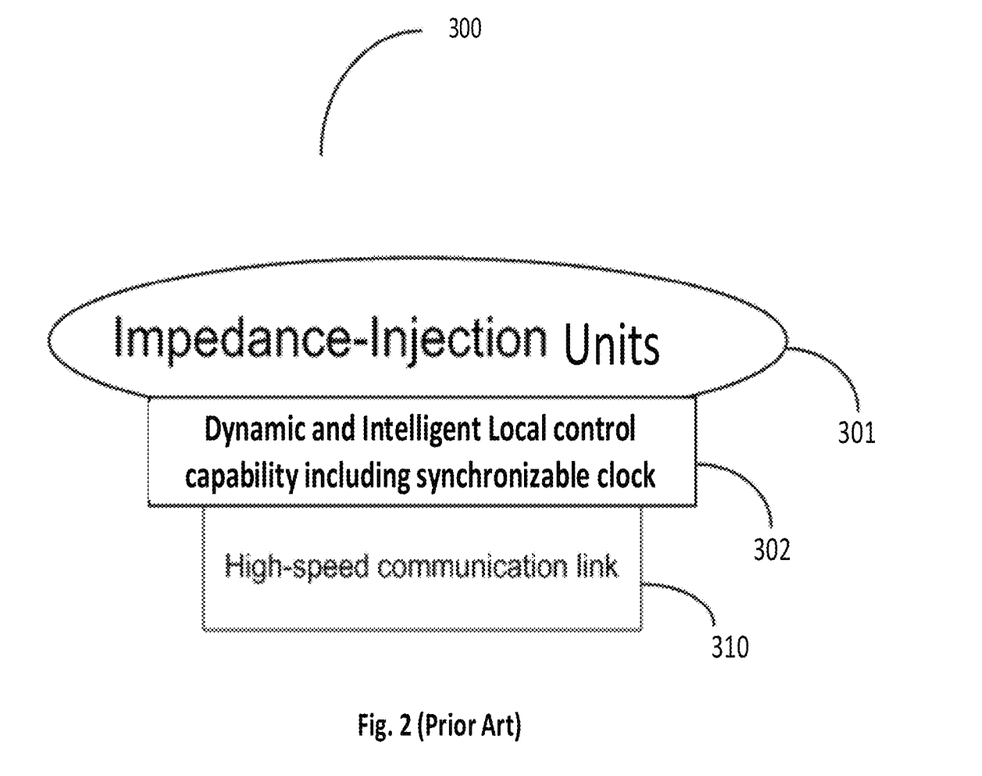
FIG. 2 is a block diagram illustrating a conventional dynamic intelligent impedance injection module with time synchronization and high speed communication capability.
Figure 3:
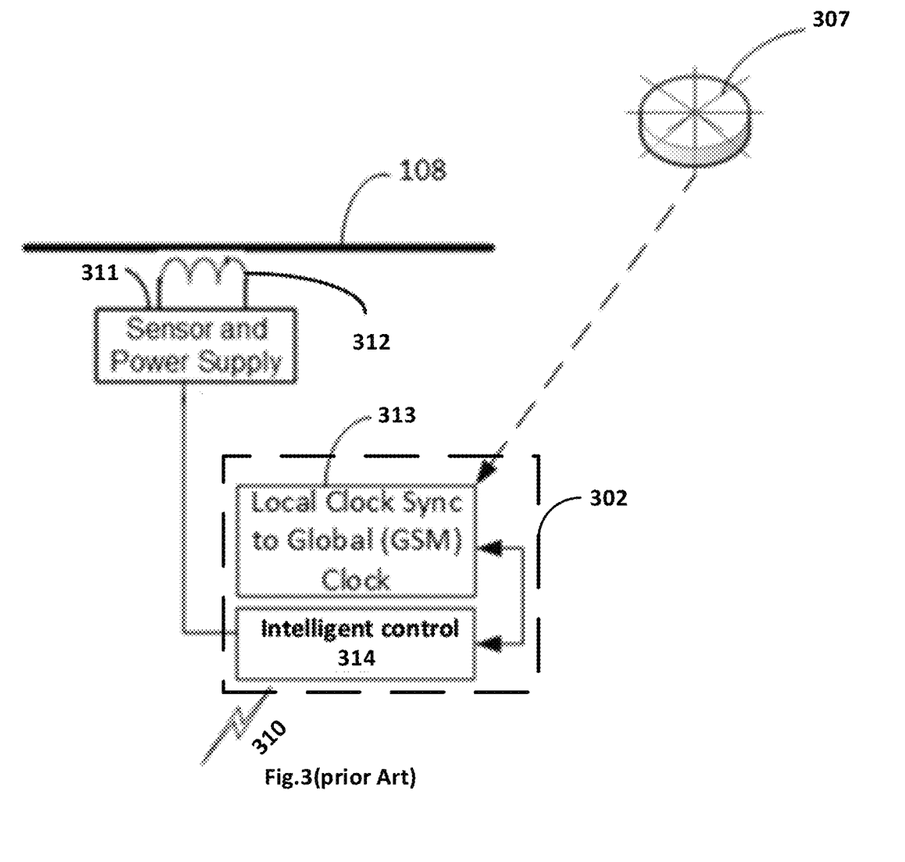
FIG. 3 is a block diagram illustrating powering an IIM from the HV power line & time synchronization of the IIM using the GPS clock.

FIG. 2 is an example improved IIM 300 (as disclosed in U.S. Pat. No. 10,218,175, entitled "Dynamic and integrated control of total power system using distributed impedance injection modules and actuator devices within and at the edge of the power grid", the disclosure of which is incorporated herein by reference) that has an impedance generation and injection capability 301, a built-in dynamic and intelligent local control capability 302 with a synchronizable clock, and a high-speed (e.g., sub-cyclic) communication link capability 310. Typically, the IIM 300, with a synchronizable clock, uses a global clock available from the global positioning satellite (GPS) 307 as shown in FIG. 3 to synchronize its actions locally using a local clock module 313 and an intelligent control (using sensor inputs and powerful processors included therein) capability 314. The high-speed (e.g., sub-cyclic speed) communication capability is used for synchronizing the operation of the IIM 300 with neighboring IIMs 300 and other FACTS based sensors and controllers on the power grid. The modules in the IIM 300 operate by extracting power from the HV transmission line 108. In some embodiments, the power is extracted using a transformer 312 coupled to the HV transmission line 108 and connected to a sensor and power supply module 311 that is able to provide regulated power to the modules of the IIM 300. In other embodiments, the power is extracted for control from a DC capacitor charged during operation of the circuit. The high-speed communication capability 310 enables the IIM 300 to effectively communicate with the neighboring IIMs 300 distributed on the high-voltage transmission lines of the power grid for providing distributed control and other FACTS based sensors and controllers on the power grid to coordinate actions for controlling the power-flow and responding to disturbances on the HV transmission lines of the power grid.

Figure 4:
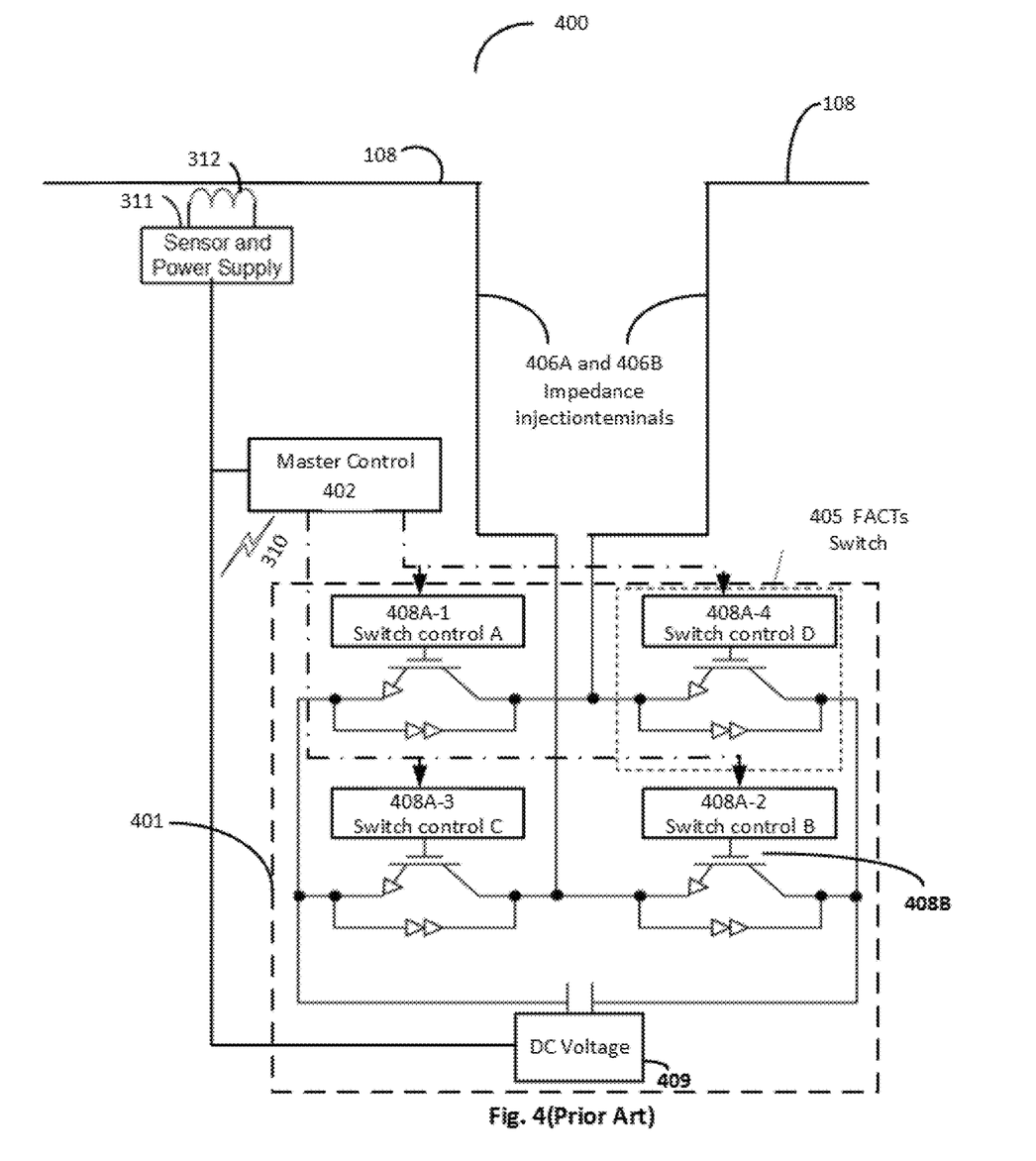
FIG. 4 is a circuit diagram illustrating an example of a transformer-less flexible alternating current (AC) transmission system (TL-FACTS) based impedance injection unit (IIU), where one or more IIUs may constitute an impedance injection module (IIM).

Referring to FIG. 4, the IIMs 300 of FIG. 2 may comprise one or more FACTS based impedance injection units (IIUs) 400 connected in sub-groups in a parallel-series configuration. The IIUs 400 typically used in the distributed IIM 300 are transformer-less FACTS (TL-FACTS) units connected directly in series with HV transmission line 108. The parallel connected IIUs 400 forming IIU sub-groups 500 are configured to carry a total line current while the series connected IIUs 400 or IIU subgroups 500 generate and inject inductive or capacitive impedance, that are cumulative, as required on to HV transmission lines 108 for power flow control. FIG. 4 shows a single example IIU 400 that uses four FACTS switches 405, each having a switch control 408A and a FACTS device 408B controlled by a master control 402 and a power supply 301 extracting power from the power line using the current transformer 304. Each of the example switches 405 use at least one FACTS device, in FIG. 4, the FACTS device is an IGBT 408B with switch control 408A as the FACTS switch 405. Though the IIU 400 is shown as having four FACTS switches, and in this case IGBT switches, such embodiment is not meant to be limiting in terms of the number of IGBTs 408B used in each switch of each IIU 400 or the type of FACTS device used in each switch (e.g., alternating switching circuits that use thyristors or other switching devices may be used for impedance generation) as is well understood by people skilled in the art. In one embodiment, the IIU 400 generates an impedance across the terminals 406A and 406B to be injected on to the HV transmission line. The injection is via terminals of the IIM 300 typically connected is series with the power line to which the IIM 300 is attached.

SUMMARY

Various embodiments of an impedance injection unit system, and related method of operation, are described herein.

One embodiment is an impedance injection unit (IIU) system. The system has IIUs, and a controller. The controller is integrated with or coupled to the IIUs. The controller is to activate each of the IIUs in a sequence of activation in each of multiple successive time periods. The IIUs inject an impedance waveform onto a high voltage (HV) transmission line. The controller is to repeatedly change an ordering of IIUs in the sequence of activation from one successive time period to a next successive time. Changing the ordering is to equalize electrical stress across the IIUs over the successive time periods.

In one embodiment the impedance injection unit (IIU) system comprise IIUs distributed across one or more impedance injection modules.

One embodiment is a method of operating an impedance injection unit (IIU) system. The method includes coupling the IIU system to a high-voltage (HV) transmission line. The method includes activating each of multiple IIUs in sequences of activation in successive time periods, to inject an impedance waveform onto the HV transmission line. The method includes repeatedly changing an ordering of IIUs in the sequences of activation in the successive time periods, to equalize electrical stress across the IIUs.

One embodiment is a tangible, non-transient, computer readable media. The media has instructions for a processing device to perform various actions. The processing device is to activate each of multiple IIUs in sequences of activation in successive time periods. Such activation injects an impedance waveform onto a high voltage (HV) transmission line. The processing device is to repeat changing an ordering of IIUs in the sequences of activation in the successive time periods. The sequences of activation and changing the ordering of IIUs equalizes electrical stress across the IIUs.

BRIEF DESCRIPTION OF THE DRAWINGS

Embodiments of the disclosure are illustrated by way of example and not limitation in the figures of the accompanying drawings in which like references indicate similar elements.

NUMBERING IN FIGURES

100—an exemplary grid
102—Impedance injection module (IIM)
106 Loads
104 Generators
108—High voltage (HV) transmission line 300—Upgraded IIM with intelligence and high speed communication capability
301—Impedance injection circuit
307 GPS satellite
310—High-speed wireless com-link
311—Sensor and Power supply
312—Transformer coupled to power line
313—Synchronizable local clock
314—Intelligent controller
400 IIM with a single Impedance Injection Unit (IIU)
401—Impedance Injection Unit
405—FACTS switch
408A—individual FACTS device control injection from 408B—IGBT (FACTS)Switch device
402—Master Control-Intelligent with clock
403—Intelligent controller
406A and 406B—Impedance injection terminals
409—DC Capacitor/DC voltage
500-1 to 500-4 parallel connected IIU sub-groups in the 300(4×2) IIM
500-$n$=IIU sub-group
500-$xv$—impedance injection from each IIU sub-group 500
501- Smoothed injected waveform injected
$t_i$—start time of injection from ith group
$t_i'$—stop time of injection from i-th sub-group
T1 to T4—Time periods for synched rotation of injection modules
Duration of to generate exemplary pseudo sinusoidal waveform shown=$d1$ to $d4$
Total duration of switched wave forms=$D=d1+d2+d3+d4$
Rotational Sequential duration for the four IIU groups=T1 to T4
Total rotation time used in the exemplary implementation=$T1+T2+T3+T4=T$

DETAILED DESCRIPTION

Distributed impedance injection modules (IIMs) comprising a plurality of transformer-less flexible alternating current transmission system (TL-FACTS) based impedance injection units (IIUs), are used to generate impedance for injection. The IIUs are configured typically as parallel connected sub-groups that are further connected in series to generate and inject impedance to control the power flow on high-voltage (HV) transmission lines. The injected waveform can be designed to be a pseudo-sinusoidal waveform by having each of the sub-groups generating impedances conforming to different start time, different durations and differing amplitudes of voltages to be injected and combined onto the HV transmission lines. The duty-cycle of operation for each sub-group is different within the injecting sub-groups. This duty-cycle differences proportionally impacts the electrical stress leading to variation in time-to-failure (TTF) of the components of the sub-groups. In order to equalize the electrical stress and TTF of the components, temporal balancing by cycling the sub-groups is herein described.

As is well understood, the reliability of any system (without redundancy built-in) is decided by the reliability of the component that has the highest failure rate, that is the component with the lowest reliability in operation. It is a requirement in the industry to improve the reliability and life-time of devices used in applications, especially in critical areas such as power grids supplying power across the nation. The application disclosed a method for improving the reliability of the FACTS based distributed IIMs 300. The failure of devices can be directly related to the stresses, electrical and thermal applied to the devices during operation. Hence it is advisable to ensure that the FACTS devices, currently, IGBTs 408B used in the IIU switches 401 all have similar electrical and thermal stress during operation. Any dissimilarity in the stresses applied to the FACTS devices 408B used will result in proportional disparity in time to failure due to accelerated aging of the devices, higher applied stress resulting in shorter time to failure, for equivalent devices. It is hence a feature in various embodiments to equalize the cumulative stress on each of the FACTS devices 408B, used in the IIUs switches 401 of the IIUs 400 in the IIMs 300 distributed over the HV transmission lines 108 of the HV power grid 100.

Figure 5:
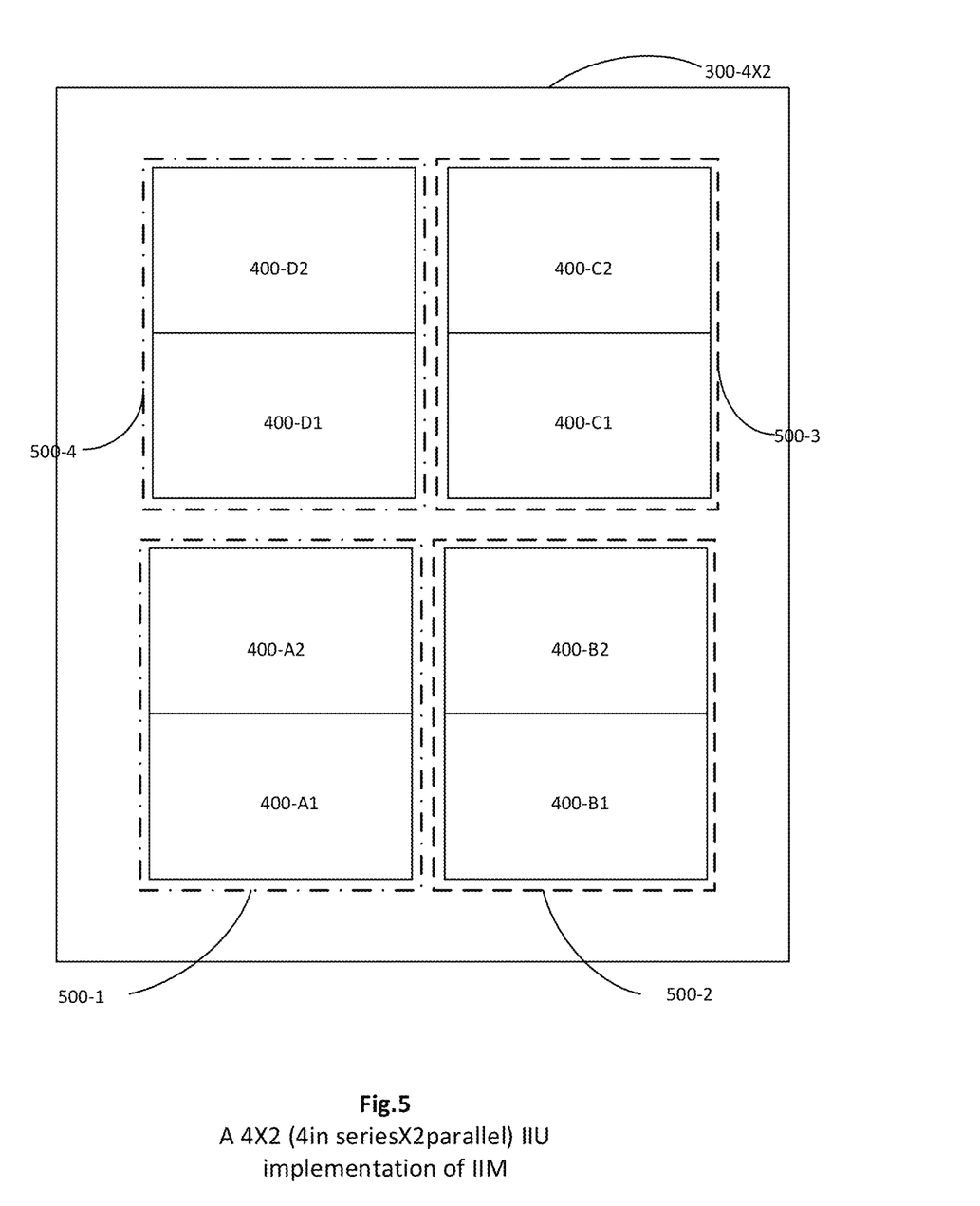
FIG. 5 is an example block diagram illustrating an IIM having 4 IIU sub-blocks each with 2 IIUs in parallel, connected in series.

Current impedance injection modules (IIM)s 300 comprising a plurality of transformer-less flexible alternating current transmission system (TL-FACTS) based impedance injection units (IIUs) 400. These IIUs 400 are used to generate impedance for injection. Referring to FIG. 5, a group of IIUs 400 are configured as parallel connected sub-groups 500-$x$ that are connected in series to generate and inject impedance to control the power flow on the HV transmission lines 108. The injected waveform is designed to be a pseudo-sinusoidal waveform by having each of the sub-groups generate impedances conforming to different start times, different durations and different impedance voltage amplitudes to be injected and combined on to the HV transmission line. The duty-cycle of operation for each sub-group 500-$x$ is different within the injecting sub-groups 500-$x$. This duty-cycle differences will proportionally impact the electrical stress leading to variation in time-to-failure (TTF) of the components of the sub-groups 500-$x$. In order to equalize the electrical stress and TTF of the components, of the IIUs 400, temporal balancing by cycling the sub-groups 500-$x$ is herein described.

The current trend is for using distributed impedance injection modules (IIMs) 300, to sense and control disturbances and power flow over the high voltage (HV) transmission lines 108 of the power grid 100. The distributed IIMs 300 comprise a plurality of transformer-less flexible alternating current transmission system (FACTS) based IIUs 400. (Though alternately IIMs with transformers may also be used.) The IIUs 400 generate and inject impedance of the correct magnitude and polarity onto the HV transmission lines 108 to control power flow and reduce the effect of disturbances. The distributed IIMs 300 are connected in series with the HV transmission line 108 and are rated to carry the maximum line current and are supported by the power lines 108 and insulated from the ground. They operate at the HV voltage of the HV transmission line 108. The distributed IIMs 300 operate by extracting power from the HV transmission line 108 to which they are coupled to generate and inject the impedances necessary to control and optimize the power flow over the HV power lines 108. Further, each IIM 300 is coupled directly to a high-voltage power transmission line 108 of the grid and operating by extracting power for sensing and control from the high-voltage transmission line 108 to which it is coupled.

The plurality of IIUs 400 of each IIM 300 can be connected in a parallel-series configuration. Sub-groups 500-$n$ (where n is 1, 2, 3, 4, etc.) of parallel connected IIUs may be connected in series to form the IIM 300. The sub-groups of parallel connected IIUs 500-$n$ within the IIM 300, are rated to carry a maximum line current. The series connection of the sub-groups 500-$n$ can generate and inject impedance in a cumulative fashion on to the HV transmission line. Sub-groups 500-$x$ of IIM 300 are configured to generate a rectangular impedance/voltage output 500-$nv$.

Though the groups of IIUs 400 are described as connected in series parallel groups forming a single IIM 300, this is not to be considered limiting. The sub-groups of series parallel connected IIUs 500-$n$ may be distributed over multiple IIMs as long as they are enabled to carry the rated maximum current. When so distributed they all operate under a designated controller as a master controller.

In order to reduce the possibility of distortion and harmonics due to the large rectangular impedance injection on the HV transmission line 108, it is ideal if a waveform that approximates a sinusoidal waveform similar to 501, can be generated and injected on to the HV transmission line 108. It is possible to generate a pseudo-sinusoidal waveform by having the various sub-groups of parallel connected IIUs 500-1 to 500-4, connected in series, activating and injecting rectangular impedances of differing durations and amplitudes (e.g., voltages) in a synchronized and timed start and stop fashion, which may be termed a sequence of activation of IIUs. These rectangular impedances, when injected on to the HV power line 108, combine together and get smoothed to form the approximation of sinusoidal waveform 501 when on the HV power line 108. This implementation though effective may require a number of sub-groups of IIUs in series, more than the number available in each IIM 300. It is then possible to use the IIUs 400 or IIU groups within a plurality of IIMs 300, as the IIMs 300 are in series on the HV transmission line 108.

Figure 6:
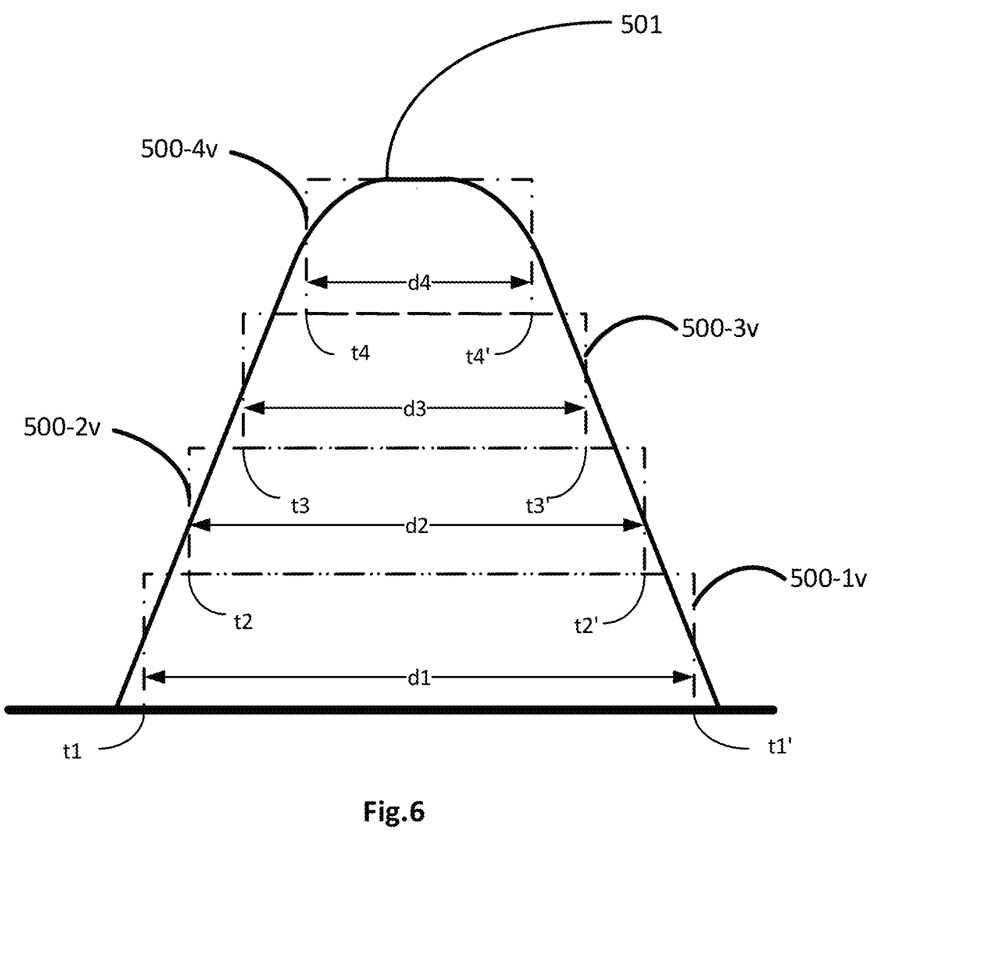
FIG. 6 is an example illustrative diagram of the IIM of FIG. 5 providing rectangular wave forms in a synchronized fashion (both start time, stop time and duration). The generated rectangular waveforms when injected combine to form a pseudo-sinusoidal wave on to the HV transmission line.

FIG. 5 shows the use of sub-groups 500-$n$ of IIUs 400 in parallel-serial connection for generation and injection of impedance. In some embodiments, the IIU sub-blocks may be distributed across more than one IIM. FIG. 5 shows an example IIM 300 with four sub-groups 500-1 comprising IIUs 400-A1 and A2, 500-2 comprising IIUs 400-B1 and B2, 500-3 comprising IIUs 400-C1 and C2 and 500-4 comprising IIUs 400-D1 and D2. In the figure each sub-group is shown as having two IIUs 400 (e.g. 400-A1 and A2 in group A to 400-D1 and D2 in Group D) connected in parallel to increase the current carrying capability of the series connected IIU sub-groups 500-$n$. These four sub-groups 500-1 to 500-4 are connected in series and synchronized in time to generate and inject rectangular impedance steps that additively combine on the HV transmission line 108 as shown in FIG. 6 to produce the pseudo-sinusoidal waveform 501. By staggering the start time $t_i$ and the stop time $t_i'$, the duration of each of the generated rectangular impedance injection waveform is adjusted to produce the plurality of impedance steps. The injected waveforms 500-1$v$ to 500-4$v$ are generated and injected to cumulatively add and produce the pseudo-sinusoidal injected impedance waveform 501. The pseudo-sinusoidal waveform is the sum of these rectangular waveforms 500-1$v$ to 500-4$v$ on the HV transmission line 108 smoothed to almost a sinusoidal waveform 501 as shown in FIG. 6. Though this example describes only equal amplitude impedance generation, it should not be considered limiting. The pseudo-sinusoidal waveform may be generated by a combination of rectangular waveforms having differing voltage amplitudes within the understood constraints of the current application. The stress on the generating unit will then be proportional to the amplitude times total duration of generation as is well understood in the industry. Equalization of this type of unequal stress is also covered by the disclosure and claimed invention.

In some embodiments the IIM 300 may not have the number of IIU groups 500-1 to 500-4 available that are needed to generate the planned number of rectangular waveforms to be injected on to the HV transmission line. In this case, resources of more than one IIM 300 can be combined to generate the impedance steps of impedance injection waveforms 500-1$v$ to 500-4$v$ to be injected as they are connected in series on the HV transmission line 108. Since the local clocks 313 on the IIMs 300 operate from the same global clock from GPS 307 as previously indicated, the step impedance generation can be staggered across the IIU sub-groups 500-1 to 500-4 in the IIMs 300 generating the impedance injection waveforms 500-1v to 500-4v.

Coordination and synchronization of impedance injection is handled by the master controller 402 within one of the IIMs 300. All the distributed IIMs 300 being configured with sufficient intelligence and processing capability and high-speed (e.g., sub-cyclic speed) communication capability of the IIM 300 for the purpose.

As discussed previously, one of the main problems of such impedance injection is the dissimilar electrical and thermal stress the various switching FACTS devices 408B in the IIU sub-groups 500-1 to 500-4 are subjected to. This is due to the differing switching durations 'd' needed to generate the pseudo-sinusoidal injected waveform. Varying injection times d1 to d4 are shown in the example implementation of FIG. 6. Times d1 to d4 may create differential stresses for the FACTS devices 408B within the different IIUs of the IIU groups 500-1 to 500-4. This differential stress levels, if not equalized can impact the lifetime of the FACTS devices differently and reduce the reliability of the IIUs impacted by the higher stress and hence the IIMs 300. In order to maximize the reliability of the FACTS devices and achieve highest operating life-times, it is necessary to stress all FACTS devices generating the step waveforms equally over time. This means that the cumulative time the injection units are turned on has to be made equal across the number of IIUs 400 used for generating the injected pseudo-sinusoidal waveform.

Figure 7:
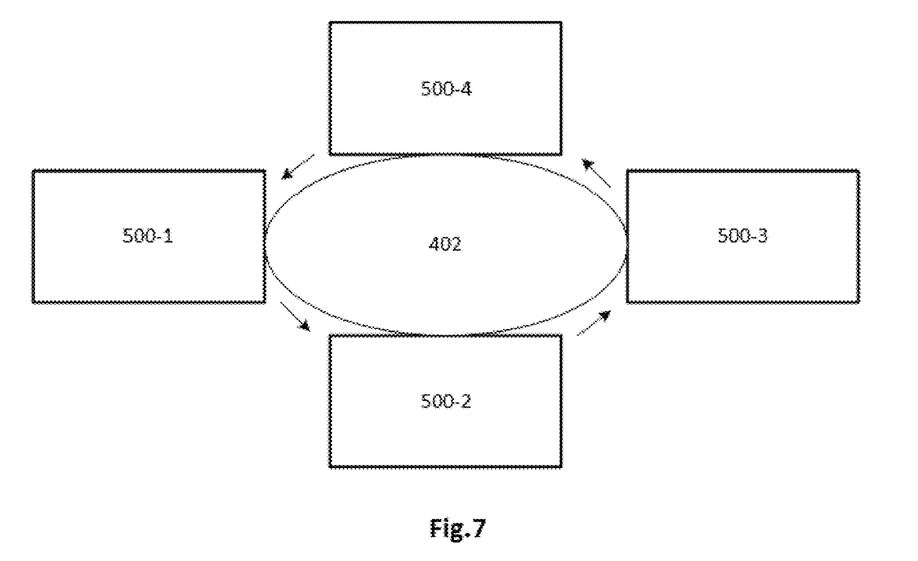
FIG. 7 shows an embodiment using duration based rotation of the injected output from the four groups of I IIUs of FIG. 5 with synchronized under control of the master controller to equalize the electrical stress across all injecting sub-groups of the IIUs.
Figure 8:
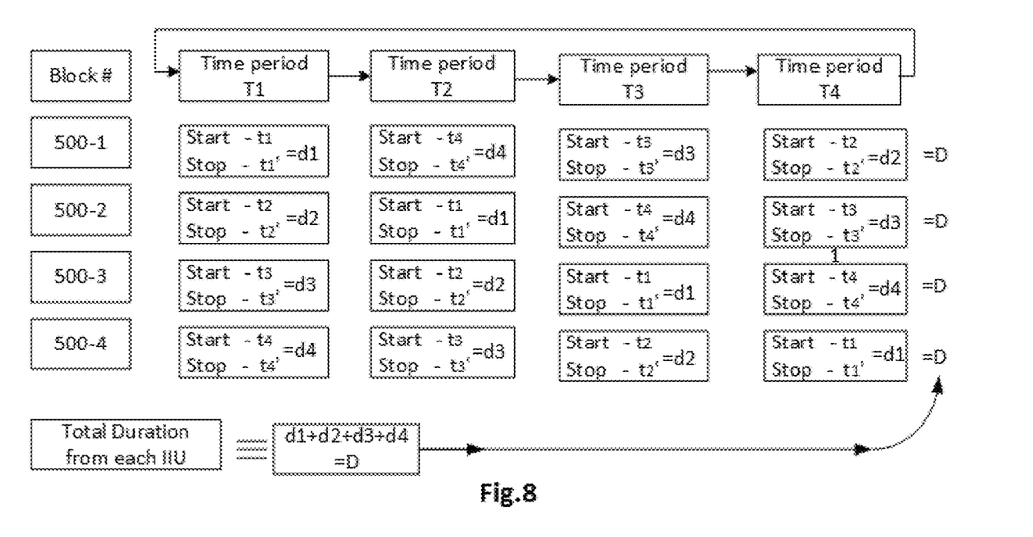
FIG. 8 shows the 4 steps injection rotation and the injected wave form for generating and injecting the pseudo-sinusoidal waveform at each time duration during rotation.

FIG. 7 shows an example and non-limiting embodiment that allow the equalization of electrical stress across the IIUs/IIU groups used to generate the injected impedance. In FIG. 7, the master controller 402 may be configured to provide a rotating switching sequencing capability enabling the number of IIUs 400A1 to 400D4 forming IIU groups 500-1 to 500-4 to be sequentially switched in a predetermined order as shown by the arrows in the figure based on either a time period or the number of injected waveforms. FIG. 8 shows one such example sequence where each IIU 400 sub-group 500-1 to 500-4 is switched and sequentially rotated to generate and output a different duration of injected rectangular waveform 500-1v to 500-4v needed for the formation of the pseudo-sinusoidal waveform 501 on to the HV transmission line 108. Further sequences with various ordering of IIUs in sequences of activation, and various changes in ordering of IIUs in sequences of activation, to equalize electrical stress across the IIUs are readily devised in keeping with the teachings herein.

FIG. 8 shows the effect of the rotational and sequential switching of the IIU groups 500-1 to 500-4, each IIU group generating and injecting a rectangular impedance waveform 500-1v to 500-4v in turn for generating the pseudo-sinusoidal wave form 501 of FIG. 6 according to one embodiment. In previous embodiments for generating the pseudo-sinusoidal waveform with no sequential rotation of the IIU 400 sub-groups, the switched waveforms from all four example IIU groups 500-1 to 500-4 create the unequal electrical stress on the switching FACTS devices due the fixed injection durations d1 to d4 that are not equal, d1 creating the highest level of electrical and thermal stress on the FACTS devices generating the rectangular impedance waveform while d4 creating the least stress.

By implementing the current method of sequential rotation of IIU groups 500-1 to 500-4 that are switched in a pre-established rotational sequence of sequences of activation by instructions provided by the master controlled 402, the switching durations are averaged over a rotational time period of T=T1+T2+T3+T4 where T1 to T4 being equal intervals. This results in the period in each injection mode waveform 500-1v to 500-4v for each IIU group 500-1 to 500-4 being equal to T/4. The total duration of switched impedances from the four IIU sub-groups 500-1 to 500-4 shown in FIG. 5 is then D=d1+d2+d3+d4 as shown in FIG. 8. By enabling such rotational switching sequence, the switched durations d1 to d4 from each of the IIU sub-groups 500-1 to 500-4 are changed and over the time period T each IIU sub-group in the example experience a similar electrical and thermal stress due to equal total duration D of switching. The impedance injection related stress is therefore equalized over the different sub-groups of IIUs 500-1 to 500-4 in the timed rotational sequence. Hence the total switched duration D for each sub-group of IIUs 500-1 to 500-4 and the electrical and thermal stress on the IIU sub-groups 500-1 to 500-4 and the associated FACTS devices may be equalized for each switching rotational sequence over the time period T as shown in FIG. 8. This provides improves the operational lifetime of the FACTS devices used increasing the system reliability.

In another example embodiment used instead of fixing the switching time period as T-1 to T-4 each being an equal elapsed time period from last rotational switching, it is possible to use a count of the number of injection cycles as basis for sequential rotational switching. In this case the rotational switching happens after 'n' injection cycles. Such a system is usable when the injection of impedance on to the HV transmission line 108 is not uniform over time but is dependent on the changes in power flow and other disturbances sensed on the HV Transmission line 108. The master controller has to keep a count of the injection cycles and after 'N' cycles a rotational switching is implemented.

There are other ways of equalizing the electrical stress on the switching devices such as changing the amplitude of the switched waveforms, equalizing the switched duration using short pulses etc. All these methods for equalizing the electrical stress are covered by the intent of this application. But, the preferred and example method for electrical stress equalization that is disclosed are the periodic rotational switching method either timed or by injection count, that allows the stress across the number of IIU sub-groups and the FACTS devices used in the IIUs, to be equalized irrespective of the stress on each sub-group in any single time period.

Figure 9:
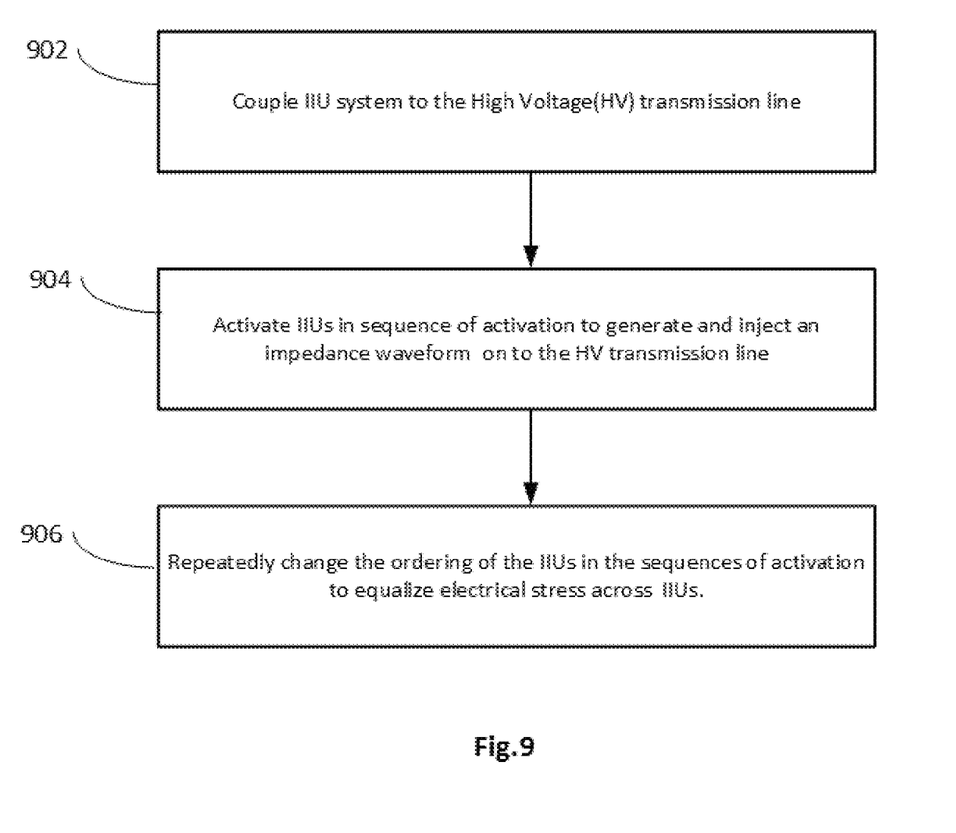
FIG. 9 is a flow chart of a method of operating an IIU system according to one embodiment.

FIG. 9 is a flow chart of a method of operating an IIU system according to one embodiment. The method is practiced by the IIU system, and more specifically practiced by a controller, which could be a processing device, one or more processors, etc. The controller could be coupled to or integrated with the IIUs. The IIUs system may comprise one or more IIMs under the control of a designated master controller.

In an action 902, the IIU system is coupled to a high-voltage transmission line. For example, impedance injection terminals of the system are connected in series in the transmission line. The IIU system configured to operate under control of a master controller.

In an action 904, the IIUs are activated in sequences of activation to inject an impedance voltage wave onto the HV transmission line. For example, individual IIUs or groups of IIUs are switched on and switched off for switching durations or injection times, in a sequence.

In an action 906, the ordering of IIUs in sequences of activation is repeatedly changed, to equalize electrical stress across the IIUs. For example, the ordering of IIUs or groups of IIUs that are activated for injection onto the HV line is rotated from one sequence to the next. Rotational switching could proceed after a time period, or after a count of the number of injection cycles, in various embodiments.

Even though the invention disclosed is described using specific embodiments, it is intended only to be examples and non-limiting. People skilled in the art will be able to understand and modify the same based on new innovations and concepts, as they are made available. The invention is intended to encompass these modifications.

The present disclosure has a number of aspects which may be practiced alone or in various combinations or sub-combinations, as desired. Also while certain embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. An impedance injection system for controlling current flow in a high voltage (HV) transmission line, the system comprising:
    a plurality of impedance injection modules (IIMs), each TIM comprising a plurality of transformerless flexible alternating current transmission system (TL-FACTS) based impedance injection units (IIUs) connected in a series or series-parallel configuration, wherein the plurality of TL-FACTS based IIUs are coupled to the HV transmission line; and
    a controller, integrated with or coupled to the plurality of TL-FACTS based IIUs, to:
    activate each of the plurality of TL-FACTS based IIUs in a sequence of activation in each of a plurality of successive time periods to generate impedances combined to form an impedance waveform to be injected into the HV transmission line; and
    repeatedly change an ordering of IIUs in the sequence of activation from one of the plurality of successive time periods to a next one of the plurality of successive time periods, to equalize electrical stress across the plurality of TL-FACTS based IIUs over the plurality of successive time periods.

2. The impedance injection system of claim 1, wherein to repeatedly change an ordering of IIUs in the sequence of activation from one of the plurality of successive time periods to a next one of the plurality of successive time periods comprises to repeatedly change the ordering of the IIUs in the sequence of activation from each of the plurality of successive time periods to the next one of the plurality of successive time periods.

3. The impedance injection system of claim 1, wherein to repeatedly change an ordering of IIUs in the sequence of activation from one of the plurality of successive time periods to a next one of the plurality of successive time periods comprises a rotation of the sequence.

4. The impedance injection system of claim 1, wherein the sequence of activation comprises a plurality of differing switching durations.

5. The impedance injection system of claim 4, wherein the sequence of activation further comprises a plurality of differing voltage amplitudes.

6. The impedance injection system of claim 1, wherein the controller is to perform temporal balancing of the activation across the plurality of TL-FACTS based IIUs by cycling subgroups of TL-FACTS based IIUs.

7. The impedance injection system of claim 1, wherein:
    the sequence of activation comprises activating and deactivating differing groups of TL-FACTS based IIUs for differing injection times in the sequence; and
    cumulative injection times of each of the differing groups of TL-FACTS based IIUs are made equal over the plurality of successive time periods.

8. The impedance injection system of claim 1, wherein to change the ordering of IIUs in the sequence of activation comprises a rotating switching sequencing.

9. The impedance injection system of claim 1, wherein to repeatedly change an ordering of IIUs in the sequence of activation the controller comprises to count a number of injection cycles as a basis for sequential rotational switching, and implement a rotational switching after a predetermined count of the injection cycles.

10. The impedance injection system of claim 1, wherein the plurality of TL-FACTS based IIUs operate under control of one designated master controller.

11. A method of operating an impedance injection unit (IIU) system, comprising:
    coupling a plurality of transformerless flexible alternating current transmission system (TL-FACTS) based impedance injection units (IIUs) to a high voltage (HV) transmission line;
    activating each of the plurality of TL-FACTS based IIUs in sequences of activation in successive time periods to generate impedances combined to form an impedance waveform to be injected into the HV transmission line; and
    repeatedly changing an ordering of IIUs in the sequences of activation in the successive time periods, to equalize electrical stress across the plurality of TL-FACTS based IIUs.

12. The method of claim 11, wherein the repeatedly changing the ordering comprises changing the ordering of the IIUs in a sequence of activation from each time period to a next time period, in the successive time periods.

13. The method of claim 11, wherein the repeatedly changing the ordering comprises rotating a switching sequence of the TL-FACTS based IIUs.

14. The method of claim 11, wherein the repeatedly changing the ordering comprises temporal balancing of the activation across the plurality of TL-FACTS based IIUs by cycling subgroups of TL-FACTS based IIUs.

15. The method of claim 11, wherein:
    each of the sequences of activation comprises activating and deactivating differing groups of TL-FACTS based IIUs for differing injection durations; and
    cumulative injection durations of each of the differing groups of TL-FACTS based IIUs are made equal over the successive time periods, by the repeatedly changing the ordering.

16. The method of claim 15, wherein the differing groups of TL-FACTS based IIUs are further activated and deactivated for injection of differing voltage amplitudes.

17. The method of claim 11, wherein the repeatedly changing the ordering comprises:
    counting a number of injection cycles as a basis for sequential rotational switching; and
    implementing a rotational switching after each predetermined count of the injection cycles, for the successive time periods.

18. A tangible, non-transitory, computer-readable media having instructions thereupon for a processing device to:
    activate each of a plurality of transformerless flexible alternating current transmission system (TL-FACTS) based impedance injection units (IIUs) in sequences of activation in successive time periods to generate impedances combined to form an impedance waveform to be injected into a high voltage (HV) transmission line, wherein the plurality of TL-FACTS based IIUs are coupled to the HV transmission line; and repeatedly change an ordering of IIUs in the sequences of activation in the successive time periods;

wherein the sequences of activation and the changing the ordering of IIUs equalizes electrical stress across the plurality of TL-FACTS based IIUs.

19. The tangible, non-transitory, computer-readable media of claim 18, wherein to repeat the changing the ordering, the instructions are further for the processing device to change the ordering of the IIUs in a sequence of activation from each time period to a next time period, in the successive time periods.

20. The tangible, non-transitory, computer-readable media of claim 18, wherein the changing the ordering comprises rotating a switching sequence of the TL-FACTS based IIUs.

21. The tangible, non-transitory, computer-readable media of claim 18, wherein to repeat the changing the ordering, the instructions are further for the processing device to perform temporal balancing of the activation across the plurality of TL-FACTS based IIUs by cycling subgroups of TL-FACTS based IIUs.

22. The tangible, non-transitory, computer-readable media of claim 18, wherein:

to activate each of the plurality of TL-FACTS based IIUs in each of the sequences of activation, the instructions are further for the processing device to activate and deactivate differing groups of TL-FACTS based IIUs for differing injection durations; and the changing the ordering of IIUs makes equal cumulative injection durations of each of the differing groups of TL-FACTS based IIUs over the successive time periods.

23. The tangible, non-transitory, computer-readable media of claim 22, wherein the differing groups of TL-FACTS based IIUs are further activated and deactivated for injection of differing voltage amplitudes.

24. The tangible, non-transitory, computer-readable media of claim 18, wherein to repeat the changing the ordering, the instructions are further for the processing device to:

count a number of injection cycles as a basis for sequential rotational switching; and perform a rotational switching after a predetermined count of the injection cycles, for the successive time periods.

\* \* \* \* \*